United States Patent [19]
Lokhoff et al.

[11] Patent Number: 5,798,990
[45] Date of Patent: Aug. 25, 1998

[54] TRANSFERRING INFORMATION VIA THE LEAD-IN AREA OF AN INFORMATION CARRIER

[75] Inventors: Gerardus C. P. Lokhoff; Constant P. M. J. Baggen, both of Eindhoven, Netherlands

[73] Assignee: U.S. Philips Corporation, New York, N.Y.

[21] Appl. No.: 716,688

[22] Filed: Sep. 16, 1996

[30] Foreign Application Priority Data

Sep. 15, 1995 [EP] European Pat. Off. ............ 95202502.1

[51] Int. Cl.$^6$ ....................................................... G11B 7/00
[52] U.S. Cl. ........................ 369/47; 369/48; 369/59; 369/275.3; 369/124
[58] Field of Search .................................. 369/47, 48, 32, 369/59, 58, 275.1, 275.3, 124

[56] References Cited

U.S. PATENT DOCUMENTS

| | | | |
|---|---|---|---|
| 5,060,221 | 10/1991 | Sako | 369/59 |
| 5,065,388 | 11/1991 | Roth et al. | 369/47 |
| 5,177,720 | 1/1993 | Kondo | 369/48 |
| 5,388,093 | 2/1995 | Yoshida et al. | 369/275.3 |
| 5,521,900 | 5/1996 | Ando et al. | 369/275.3 |
| 5,587,979 | 12/1996 | Bluthgen | 369/48 |

FOREIGN PATENT DOCUMENTS

| | | |
|---|---|---|
| 0325325A2 | 7/1989 | European Pat. Off. . |
| 04-332966 | 11/1992 | Japan . |
| 07-169205 | 7/1995 | Japan . |

OTHER PUBLICATIONS

CEI/IEC Publication 908, 1st edition, 1987. Amendment 60A (Netherlands) 80.

Primary Examiner—Tod R. Swann
Assistant Examiner—Kim-Kwok Chu
Attorney, Agent, or Firm—Edward Blocker

[57] ABSTRACT

Recording apparatus for recording in a track on an optical information carrier a first channel signal representing a main information signal, a second channel signal representing a cue information signal and a third channel signal representing a sub information signal. The main information signal includes at least one programme item and the cue information signal includes for the at least one programme item an indication of its location on the track. The recording apparatus includes a unit for receiving the main information signal, the cue information signal and the sub information signal; a unit for encoding the main information signal providing the first channel signal; a unit for encoding the cue information signal, providing the second channel signal; a unit for encoding the sub information signal, providing the third channel signal carrying sub information packs in substantially non-interleaved form, by generating sub information packs, including data from the sub information signal plus data for error detection and correction thereof, in substantially non-interleaved form; and a unit for writing the first channel signal in a main information area of the track on the information carrier and for writing the second channel signal and the third channel signal in a lead-in area of the track preceding the main information area.

42 Claims, 9 Drawing Sheets

TRANSFERRING INFORMATION VIA THE LEAD-IN AREA OF AN INFORMATION CARRIER

BACKGROUND OF THE INVENTION

The invention relates to a method of recording in a track on an optical information carrier a first channel signal representing a main information signal, a second channel signal representing a cue information signal and a third channel signal representing a sub information signal, said main information signal comprising at least one programme item and said cue information signal comprising for said at least one programme item an indication of its location in said track, the recording method comprising the steps of

- receiving the main information signal, the cue information signal and the sub information signal,
- encoding the main information signal, resulting in said first channel signal,
- encoding the cue information signal, resulting in said second channel signal,
- encoding the sub information signal by generating sub information packs comprising data from said sub information signal plus data for error detection and correction thereof, resulting in said third channel signal,
- writing the first channel signal in a main information area of said track on the information carrier,
- writing the second channel signal and the third channel signal in a lead-in area of said track preceding the main information area.

The invention further relates to a recording apparatus for carrying out this method of recording, an optical information carrier obtained by such a recording method and a reproduction apparatus for reproducing information from such an information carrier.

Figure 1:
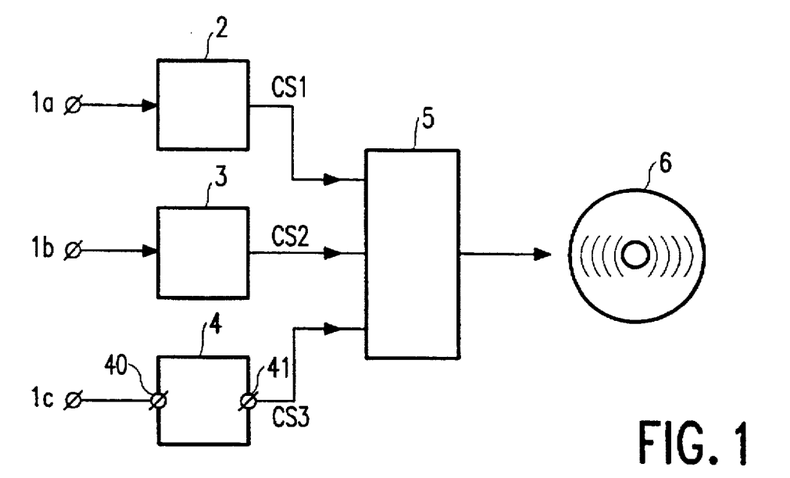
FIG. 1 shows, in a simplified form, the means for recording on a Compact Disc as described in [doc. 1].

Such an optical information carrier is described in CEI/IEC Publication 908, [doc. 1] and Amendment 60A (Netherlands)80 to that Publication [doc. 2]. When a sub information signal is recorded as prescribed in [doc. 1] and [doc. 2], the sub information signal is prepared for recording using an encoder as depicted in FIG. 1. Such an encoder forms sub information packs comprising data from the sub information signal and data for error detection and correction thereof. The data is organised in six-bit units, referred to as symbols. The encoder comprises cross-connections to change the sequence of the symbols within a sub information pack in a predescribed way and it comprises storage elements to delay the individual symbols in a predescribed way, such that the signal which is written to the information carrier, the third channel signal, comprises the sub information packs in interleaved form. To reproduce the sub information signal from a third channel signal that has been recorded in this way on an information carrier, the reproduction apparatus incorporates a decoder that comprises storage elements to balance the delay of the individual symbols being read and cross-connections to restore the original sequence of the symbols, thus repealing the interleaving of the recorded sub information packs.

SUMMARY OF THE INVENTION

An object of the present invention is to provide a method of recording as described in the preamble which enables a simplified way of decoding the third channel signal, recorded in the lead-in area of a track on the optical information carrier, to recover the sub information signal. Further objects of the invention are to provide a recording apparatus which applies this method of recording, an optical information carrier recorded on such a recording apparatus and a reproduction apparatus for reproducing information from such an information carrier.

The method of recording according to the present invention is characterized in that said sub information packs are generated in substantially non-interleaved form and included in that form in said third channel signal. When said third channel signal is recorded on an optical information carrier as prescribed in [doc. 2], the sub information signal is encoded such that sub information packs are generated comprising data from the sub information signal plus data for error detection and correction thereof, the sequence of the symbols in a sub information pack is changed and the individual symbols are delayed. For reproduction of the sub information signal from such an information carrier, a complex decoder as described in the prior art must be incorporated in the reproduction apparatus. To allow the use of a simplified decoder in a reproduction apparatus which reproduces the sub information signal from the lead-in area, the present invention prescribes that sub information packs are included in non-interleaved form in the third channel signal.

If a method of recording is applied which comprises the step of interleaving sub information packs according to the prior art, an embodiment of the invention is characterized in that said encoding step further comprises a step in which said sub information packs are post-interleaved after said interleaving step, so as to generate the said sub information packs in substantially non-interleaved form. This embodiment is particularly useful for upgrading those implementations of the prior art recording method in which the comprised steps cannot be changed but new steps can be added. The disadvantage of an extra step in the recording method is outbalanced by the advantage of the upgrading: to enable a simplified way of decoding.

An embodiment of the invention may further be characterized in that said step of encoding the sub information signal comprises the steps of

- generating first codewords indicating sub information packs being substantially non-interleaved,
- including a first codeword in sub information packs that are generated in substantially non-interleaved form. This codeword may assist a reproduction apparatus in recognising sub information packs that can be decoded using a simplified decoder.

A further embodiment of the invention is adapted to record a first sub information signal in non-interleaved form as described hereinbefore, plus a second sub information signal, and is characterized in that the recording method comprises the steps of

- encoding said second sub information signal by generating second sub information packs comprising data from said second sub information signal plus data for error detection and correction thereof, and by interleaving said second sub information packs,
- inserting said interleaved second sub information packs in said third channel signal. Thus, this method provides sub information packs recorded for simplified decoding plus sub information packs recorded according to the prior art. This is useful if the two sub information signals are targetted at different types of decoders, i.e. different types of reproduction apparatus. For instance, if the two sub information signals carry substantially the same information, both a simplified decoder and a decoder according to the prior art find recorded on the information carrier sub information packs that it can decode, so that both types of decoders can reproduce the substantially same information.

The method for recording a first plus a second sub information signal may further be characterized in that the recording method comprises the steps of generating first and second codewords, the first codewords indicating sub information packs being substantially non-interleaved, the second codewords indicating sub information packs being substantially interleaved, including a first codeword in sub information packs that are generated in substantially non-interleaved form and carried in that form in said third channel signal, and including a second codeword in sub information packs that are generated in substantially interleaved form and carried in that form in said third channel signal. The codeword may assist a reproduction apparatus in recognising sub information packs that can be decoded by the type of decoder comprised in the reproduction apparatus. Sub information packs labelled with a first codeword can be decoded by a simplified decoder and packs labelled with a second codeword can be decoded by a decoder according to the prior art. It is noted here that a codeword may carry more information than the mere indication of whether or not packs are interleaved; it may, for instance, also indicate the type of information carried in the pack. Therefore, a multitude of first codewords and a multitude of second codewords may be used. In each sub information pack, one and only one codeword is included; one from a multitude of first codewords or one from a multitude of second codewords.

An embodiment of the invention may further be characterized in that said first mentioned sub information signal comprises packets carrying coded text. The coded text may comprise different information categories, such as track list, information about the performing artists and the album title. Further, codes within the coded-text packets and commands packets that provide links to particular information categories may provide means for interactive selection from a menu-type of text presentation. It is particularly useful to provide these packets carrying coded text in the lead-in area of the information carrier, as this allows the decoding and presentation of the text prior to the reproduction of the main information signal that is recorded in the main information area.

A further refinement of the latter embodiment may be characterized in that said step of generating codewords is adapted to generating codewords that further mark those sub information packs in which at least part of a packet carrying coded text is comprised. Thus, the codeword comprised in a sub information pack also identifies the type of information carried in that pack. This is useful, during reproduction, for providing the appropriate data to different types of data decoders, such as a text decoder, a MIDI-data decoder, etcetera.

For recording on an optical information carrier such as a CD or CDV disc, each of the described recording methods may be applied, further characterized in that said third channel signal is recorded in a sub information channel which is formed by at least one of the subcode channels R-W as defined in [doc. 1]. A method for recording a sub information signal in the subcode channels R-W on CD can be deduced from the description in [doc. 2]. The method disclosed in the present invention, however, enables a simplified way of decoding the third channel signal, recorded in the lead-in area of a track.

An optical information carrier having a first channel signal recorded in a main information area of a track on the information carrier and having second and third channel signals recorded in a lead-in area of said track preceding said main information area, said first channel signal representing a main information signal comprising at least one programme item, said second channel signal representing a cue information signal comprising for said at least one programme item an indication of its location on said track, said third channel signal representing a sub information signal carrying sub information packs comprising data from said sub information signal plus data for error detection and correction thereof is characterized according to the present invention in that said sub information packs are carried in substantially non-interleaved form in said recorded third channel signal. When said third channel signal has been recorded on an optical information carrier as prescribed in [doc. 2], the sub information packs are comprised such that the sequence of the symbols in a sub information pack has been changed and the individual symbols have been delayed. To reproduce the sub information signal from such an information carrier, a complex decoder as described in the prior art must be incorporated in the reproduction apparatus. To allow the use of a simplified decoder in a reproduction apparatus which reproduces the sub information packs from the lead-in area, the present invention prescribes that those sub information packs are comprised in non-interleaved form in the third channel signal.

A further embodiment of the optical information carrier according to the invention is characterized in that second sub information packs, comprising data from a second sub information signal plus data for error detection and correction thereof, are included in substantially interleaved form in said recorded third channel signal. Thus, this information carrier carries sub information packs fit for simplified decoding plus sub information packs fit for decoding according to the prior art. This allows the information carrier to be suitable for reproduction on different types of reproduction apparatus incorporating different types of decoders.

A further refinement of this embodiment is characterized in that a first codeword is included in sub information packs that are carried in substantially non-interleaved form in said recorded third channel signal and in that a second codeword is included in sub information packs that are carried in substantially interleaved form in said recorded third channel signal. The codeword may assist a reproduction apparatus in recognising sub information packs that can be decoded by the type of decoder comprised in the reproduction apparatus. Sub information packs labelled with a first codeword can be decoded by a simplified decoder and packs labelled with a second codeword can be decoded by a decoder according to the prior art.

A recording apparatus for recording in a track on an optical information carrier a first channel signal representing a main information signal, a second channel signal representing a cue information signal and a third channel signal representing a sub information signal, said main information signal comprising at least one programme item and said cue information signal comprising for said at least one programme item an indication of its location on said track, the recording apparatus comprising means for receiving the main information signal, the cue information signal and the sub information signal, means for encoding the main information signal, providing said first channel signal, means for encoding the cue information signal, providing said second channel signal, means for encoding the sub information signal by generating sub information packs comprising data from said sub information signal plus data for error detection and correction thereof, providing said third channel signal, means for writing the first channel signal in a main information area of said track on the information carrier and for writing the second channel signal and the third channel signal in a lead-in area of said track preceding the main information area, is characterized according to the present invention, characterized in that said means for encoding the sub information signal are adapted to generate said sub information packs in substantially non-interleaved form and to provide said third channel signal carrying sub information packs in that form. When the sub information signal is encoded as prescribed in [doc. 2], sub information packs are generated comprising data from the sub information signal plus data for error detection and correction thereof, the sequence of the symbols in a sub information pack is changed and the individual symbols are delayed. For reproduction of the sub information signal from such an information carrier, a complex decoder as described in the prior art must be incorporated in the reproduction apparatus. To allow the use of a simplified decoder in a reproduction apparatus which reproduces the sub information packs from the lead-in area, the present invention prescribes that the sub information encoder comprised in the recording apparatus generates sub information packs in non-interleaved form.

A further embodiment of the recording apparatus according to the invention is adapted to record a first sub information signal in non-interleaved form as described hereinbefore, plus a second sub information signal, and is characterized in that the recording apparatus comprises means for encoding said second sub information signal by generating second sub information packs comprising data from said second sub information signal plus data for error detection and correction thereof and by interleaving said second sub information packs, means for inserting said interleaved second sub information packs in said third channel signal. Thus, this recording apparatus records sub information packs that are suitable for simplified decoding plus sub information packs that are suitable for decoding by a decoder according to the prior art. This is useful if the two sub information signals are targetted at different types of decoders, i.e. different types of reproduction apparatus. The recording apparatus need not comprise means for receiving the second sub information signal if that second signal is substantially the same as the first sub information signal. Thus, the same information may be recorded for different types of decoders, i.e. for simplified decoding as well as for decoding according to the prior art.

A reproduction apparatus for reproducing information from a track on an optical information carrier, the apparatus being provided with reading means for reading a first channel signal representing a main information signal recorded in a main information area of said track, a second channel signal representing a cue information signal and a third channel signal representing a sub information signal, said second and third channel signals having been recorded in a lead-in area of said track preceding said main information area, means for decoding the first channel signal to recover said main information signal, means for decoding the second channel signal to recover said cue information signal, means for decoding the third channel signal to recover said sub information signal, said means comprising means for error detection and correction, so as to correct errors that may be present in said third channel signal, is characterized according to the present invention in that said means for decoding the third channel signal are devoid of means for de-interleaving. Thus, the decoder is simplified with respect to the prior art decoder in that the storage elements for balancing the delay of the individual symbols and the cross-connections for restoring the original sequence of the symbols are omitted.

An embodiment of a reproduction apparatus according to the present invention is characterized in that said means for decoding said third channel signal comprises means for recovering said codeword from a sub information pack, means for comparing said codeword to first codewords indicating sub information packs being substantially non-interleaved, switching means being adapted to enable the supply of said sub information signal to the output in response to recognising said codeword as being a first codeword and being adapted to disable the supply of said sub information signal to the output in response to recognising said codeword as not being a first codeword. Thus, the decoder recognises which sub information packs can be decoded successfully and which cannot. If the decoder would not examine the codeword, it would have to rely solely on the error detection to identify packs that it cannot decode, at the risk of erronously accepting an interleaved pack that, by chance, produces no errors or only a few.

A reproduction apparatus for reproducing information from a track on an optical information carrier, the apparatus being provided with reading means for reading a first channel signal representing a main information signal recorded in a main information area of said track, a second channel signal representing a cue information signal and a third channel signal representing a sub information signal, said second and third channel signals having been recorded in a lead-in area of said track preceding said main information area, means for decoding the first channel signal to recover said main information signal, means for decoding the second channel signal to recover said cue information signal, means for decoding the third channel signal to recover said sub information signal, said means comprising means for de-interleaving said third channel signal, so as to obtain a de-interleaved third channel signal, said decoding means further comprising error correction means for error detection and correction, so as to correct errors that may be present in said third channel signal, is characterized according to the present invention in that said means for decoding comprise switching means being adapted to provide said third channel signal to said error correction means in response to the presence of a first control signal and to provide said de-interleaved third channel signal to said error correction means in response to the presence of a second control signal. Thus, this decoder is capable of decoding interleaved packs and of decoding non-interleaved packs. The said control signals determine which type of decoding is in operation.

An embodiment of the decoder may comprise a decoder according to the prior art, supplemented with a switch that supplies to the error detector either the packs that are provided to the input of the de-interleaver, thus bypassing the de-interleaver, or the packs that are provided by the output of the de-interleaver.

Another embodiment of the decoder may comprise a decoder according to the prior art, preceded by an interleaver similar to the one described in |doc. 2| for use during recording, plus a switch that supplies to the prior art decoder either the packs that are provided to the input of the interleaver, thus bypassing the interleaver, or the packs that are provided by the output of the interleaver. Both embodiments supply the same signal at the output of the error detector, except that the latter embodiment exhibits a constant extra delay when non-interleaved packs are being decoded.

A further embodiment of a reproduction apparatus according to the present invention is characterized in that it further comprises means for generating said first control signal in correlation with reading the lead-in area of said track and said second control signal in correlation with reading the main information area of said track. Thus, the decoder will apply de-interleaving when it reads the main information area and it will not apply de-interleaving when it reads the lead-in area. It is noted here, that according to the prior art sub information packs shall be interleaved, irrespective of the area in which they are recorded. This invention discloses sub information packs being recorded in non-interleaved form in the lead-in area.

Another embodiment of a reproduction apparatus according to the present invention is characterized in that said means for decoding the third channel signal being adapted to reconstruct, from the data comprised in said sub information packs, packets carrying coded text. Thus, the decoder does or does not apply de-interleaving, depending on the codeword. If the decoder would not examine the codeword, it would have to apply error detection both before and after de-interleaving to decide whether or not de-interleaving is required, at the risk of taking a wrong decision.

An embodiment of a reproduction apparatus according to the invention may further be characterized in that said means for decoding the third channel signal being adapted to reconstruct, from the data comprised in said sub information packs, packets carrying coded text. The coded text may comprise different information categories, such as a track list, information about the performing artists and the album title, and the reproduction apparatus may enable a listener to select which to display, for instance, from a menu-type of text presentation. Further information may be retrieved from the packets, for instance for making the presentation on the display more attractive, like colour attribute codes and coded graphics. The reproducing apparatus may incorporate various types of display, because information supporting presentation on different types of displays may be provided in the code-text packets.

It is particularly useful to read these packets carrying coded text from the lead-in area of the information carrier, as this allows the decoding and presentation of the text prior to the reproduction of the main information signal that is recorded in the main information area. Thus, a listener may, for instance, select which tracks to play before the actual playback has started. A reproduction apparatus may store the coded-text packets, read from the lead-in area, in e.g. a RAM-type of memory incorporated in the apparatus, so that it can reproduce the information from the packets also during playback of the main information signal.

A further refinement of the latter embodiment may be characterized in that said means for decoding the third channel signal being adapted to comparing said codeword to codewords identifying sub information packs that comprise at least part of a packet carrying coded text, reconstructing packets carrying coded text from data comprised in those sub information packs that are recognised as comprising at least part of a packet carrying coded text, providing said packets carrying coded text to means adapted to decoding and displaying text. Thus, the decoder can identify from the codeword the type of information carried in the sub information pack. This is useful for providing the appropriate data to different types of data decoders, such as a text decoder, a MIDI-data decoder, etcetera.

It is noted here that a system, information carrier and reproduction arrangement for conveying packets carrying coded text via a sub channel on an information carrier are known from the European patent application EP 0 325 325. That patent application, however, does not disclose packets carrying textual information being recorded in the lead-in area of a track on an information carrier. Further, the present invention discloses a method of recording that enables a simplified way of decoding the information during reproduction.

BRIEF DESCRIPTION OF THE DRAWINGS

The invention will now be described in more detail, by way of example, with reference to the accompanying drawings, in which.

DESCRIPTION OF THE PREFERRED EMBODIMENTS

FIG. 1 shows a recording apparatus according to the prior art, for recording channel signals on an optical information carrier in accordance with [doc. 1] and [doc. 2]. The recording apparatus comprises an input terminal 1a for receiving a main information signal, which is coupled to the input of a main information encoder 2. Said main information encoder encodes the main information signal as described in [doc. 1], resulting in a first channel signal CS1 that is being provided at the output of the main information encoder. Said output is coupled to the input of writing means 5, said writing means comprising means for multiplexing multiple channel signals and for information-medium specific channel encoding as described in [doc. 1]. The signal generated in writing means 5 is recorded on an optical information carrier 6. The recording apparatus further comprises an input terminal 1b for receiving a cue information signal, which is coupled to the input of a cue information encoder 3. Said cue information encoder encodes the cue information signal as described in [doc. 1], resulting in a second channel signal CS2 that is being provided at the output of the cue information encoder. Said output is coupled to another input of the writing means 5 described hereinbefore. The recording apparatus further comprises an input terminal 1c for receiving a sub information signal, which is coupled to the input 40 of a sub information encoder 4. Said sub information encoder encodes the sub information signal as described in [doc. 2], resulting in a third channel signal CS3 that is being provided at the output 41 of the sub information encoder. Said output is coupled to another input of the writing means 5 described hereinbefore. In the embodiments of the present invention, writing means 5 are adapted to write the first channel signal in the main information area of a track on the optical information carrier and to write the second and third channel signals in the lead-in area of said track preceding the main information area.

Figure 2:
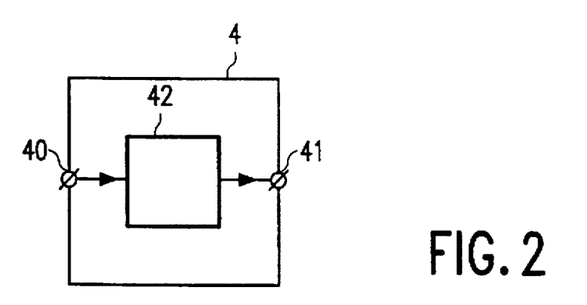
FIGS. 2 and 4 show embodiments of the encoder for encoding the sub information signal according to the present invention, adapted for generating non-interleaved sub information packs.

FIG. 2 shows an embodiment of the sub information encoder 4 according to the present invention. This embodiment comprises an input 40 for receiving a sub information signal, coupled to the input of means 42 which generate and add data for error detection and correction thereof. The output of said means 42 is coupled to output 41 and supplies the resulting third channel signal.

Figure 3:
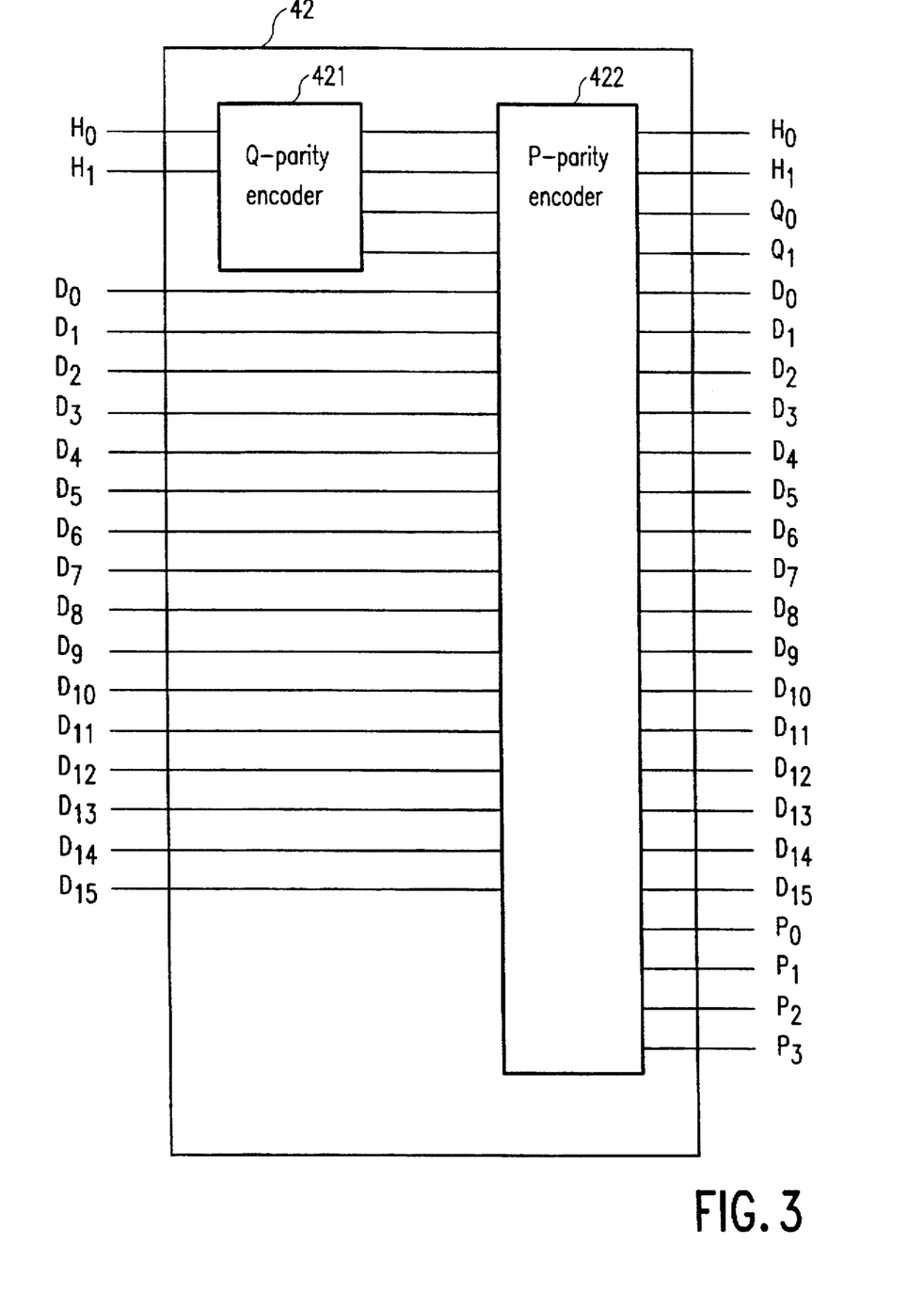
FIG. 3 shows the means for generating and adding data for error detection and correction thereof, as described in [doc. 2].

Means 42 are known from [doc. 2] and depicted in more detail in FIG. 3. These means comprise a Q-parity encoder that takes the symbols H0 and H1 as input and provides the symbols H0, H1, Q0 and Q1 as output. The symbols Q0 and Q1 contain Q-parity data. Means 42 further comprise a P-parity encoder that takes the symbols H0, H1, Q0, Q1 and D0 to D15 as input and provides the symbols H0, H1, Q0, Q1, D0 to D15 and P0 to P3 as output. The symbols P0 to P3 contain P-parity data. The symbols H0, H1, Q0, Q1, D0 to D15 and P0 to P3 together form a sub information pack. It is noted here that means 42 do not comprise means for changing the symbol sequence and delaying the individual symbols as prescribed in [doc. 2].

Figure 4:
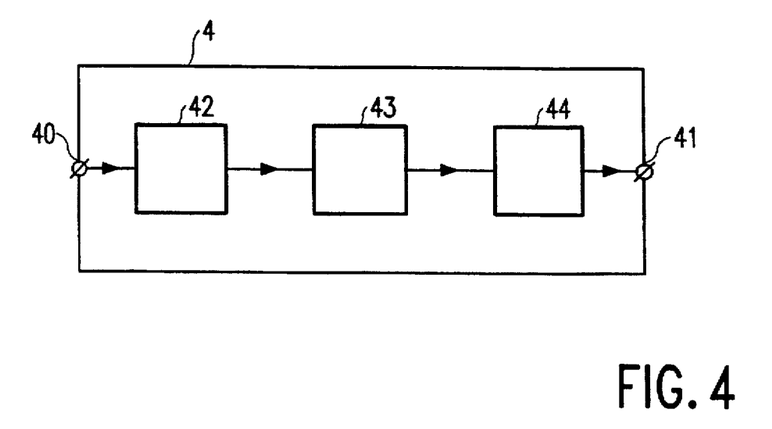

FIG. 4 shows another embodiment of the sub information encoder 4 according to the present invention. This embodiment comprises an input 40 for receiving a sub information signal, coupled to the input of means 42 described hereinbefore. The output of said means 42 is coupled to the input of interleaving means 43 described hereafter. The output of said interleaving means is coupled to the input of post-interleaving means 44 described hereafter. The output of said post-interleaving means is coupled to output 41 and supplies the resulting third channel signal.

Figure 5:
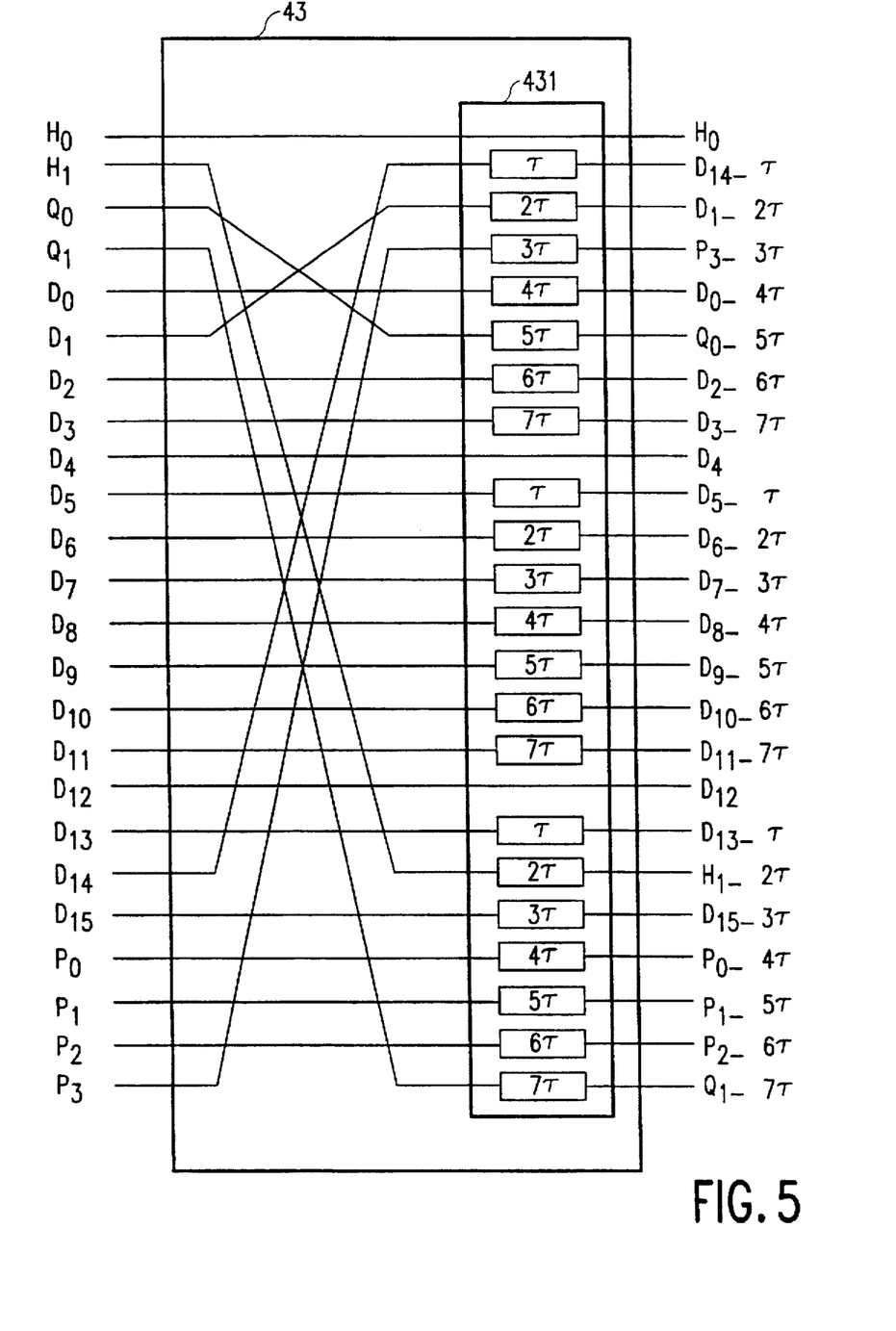
FIG. 5 shows the cross-connections for changing the symbol sequence and the means for delaying the individual symbols, as described in [doc. 2].

Interleaving means 43 are known from [doc. 2] and depicted in more detail in FIG. 5. These means comprise cross-connections for changing the symbol sequence and means 431 for delaying the individual symbols. The delay applied to an individual symbol is a multiple in the range of 0 to 7 of the period $\tau$, in which said period $\tau$ stands for the period of time that corresponds to writing one sub information pack.

Figure 6:
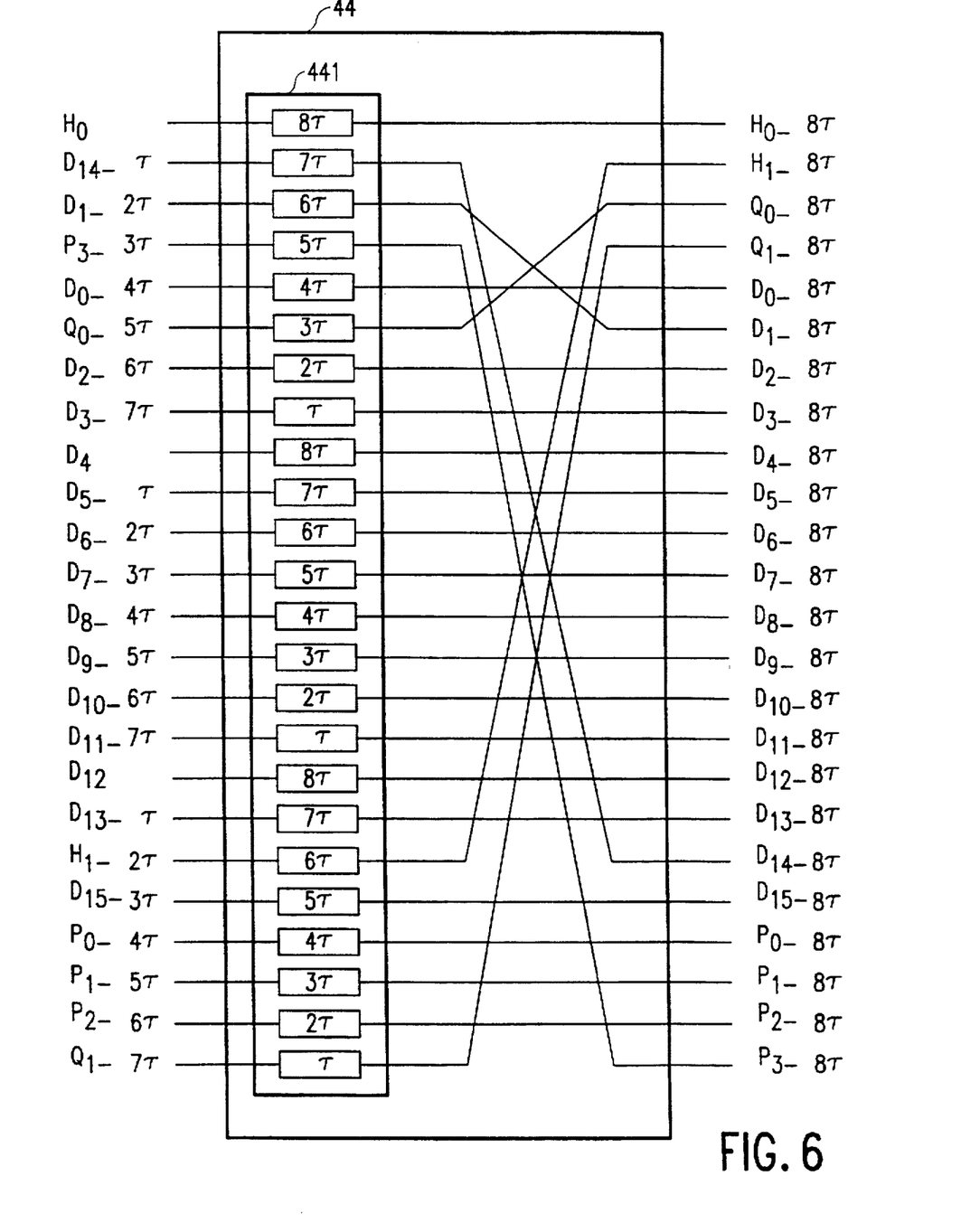
FIG. 6 shows the means for post-interleaving.

Post-interleaving means 44 are depicted in more detail in FIG. 6. These means comprise means 441 for delaying the individual symbols and cross-connections so as to restore the symbol sequence. The delay applied to an individual symbol is a multiple of the period $\tau$, said period $\tau$ being described hereinbefore, so as to balance the delay applied to the symbol in the interleaving means, and more specifically so as to delay each individual symbol in the combination of interleaving means plus post-interleaving means by a period equal to eight or a multiple of eight times the period $\tau$.

Figure 7:
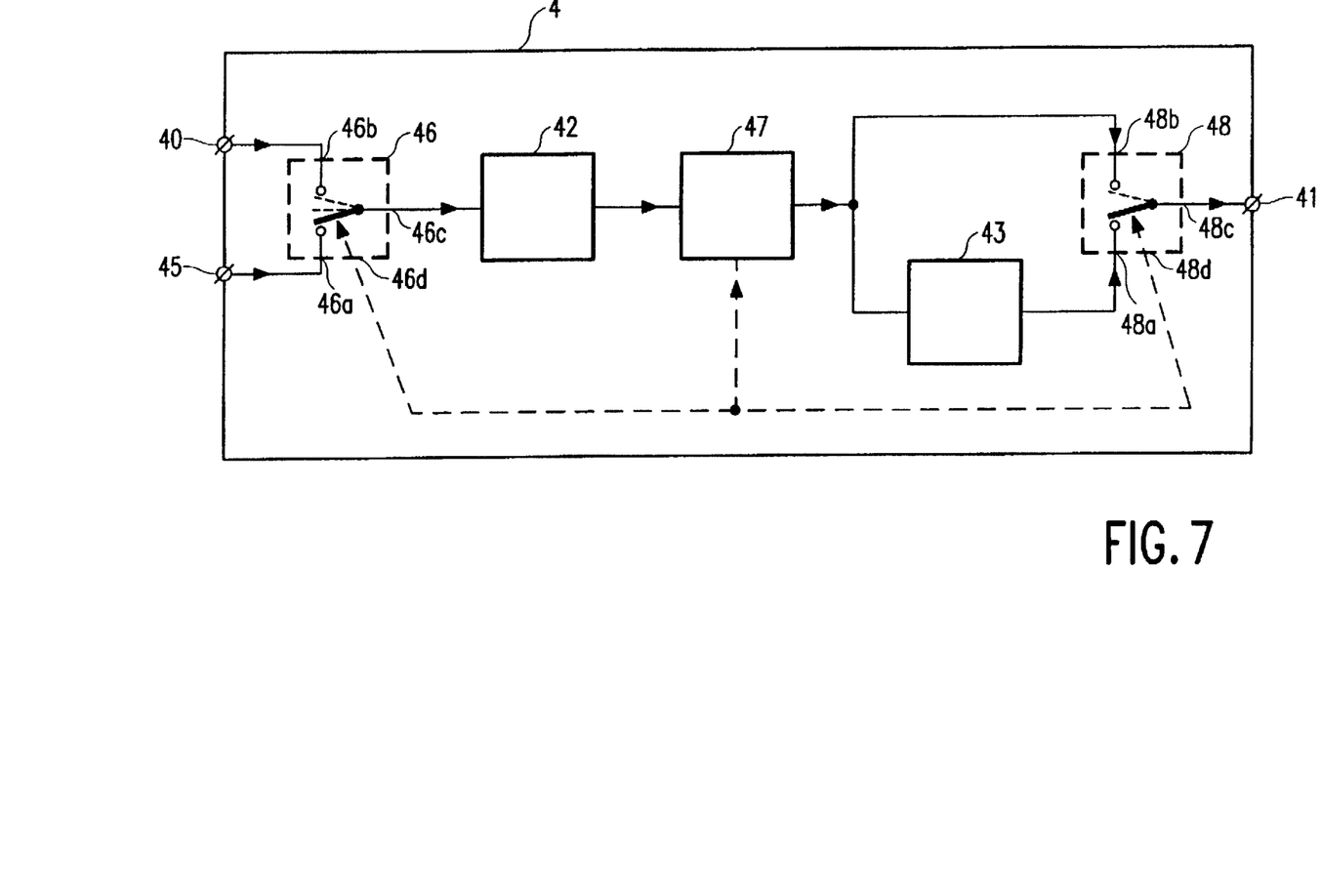
FIGS. 7 and 8 show embodiments of the encoder for encoding the sub information signal according to the present invention, adapted for generating both interleaved and non-interleaved sub information packs.

FIG. 7 shows another embodiment of the sub information encoder 4 according to the present invention. This embodiment comprises an input 40 for receiving a first sub information signal, coupled to input 46a of switching means 46. The embodiment further comprises an input 45 for receiving a second sub information signal, coupled to input 46b of switching means 46. The switching means couple the signal from input 46a or the signal from input 46b or none to the output 46c, in dependence of the control signal supplied to control input 46d. It is advantageous to put the switching means in their neutral position, coupling none of the inputs to the output, for a transient period when changing from one input to another, so as to take into account the delay in interleaving means. The output 46c of said switching means is coupled to the input of means 42 described hereinbefore. The output of said means 42 is coupled to the input of means 47, which comprises means for generating codewords and for including a codeword in the sub information pack, in dependence of the control signal supplied to its control input. The output of means 47 is coupled to the input of interleaving means 43 and to input 48b of switching means 48. Interleaving means 43 have been described hereinbefore. The output of said interleaving means is coupled to input 48a of switching means 48. The switching means couple the signal from input 48a or the signal from input 48b to the output 48c, in dependence of the control signal supplied to control input 48d. The output 48c of said switching means is coupled to output 41 and supplies the resulting third channel signal.

It is noted here that the same sub information signal may be supplied to both inputs 46a and 46b of switching means 46. Thus, the same information may be recorded in interleaved form as well as in non-interleaved form. Consequently, the recording apparatus need not comprise an input for receiving a second sub information signal.

Figure 8:
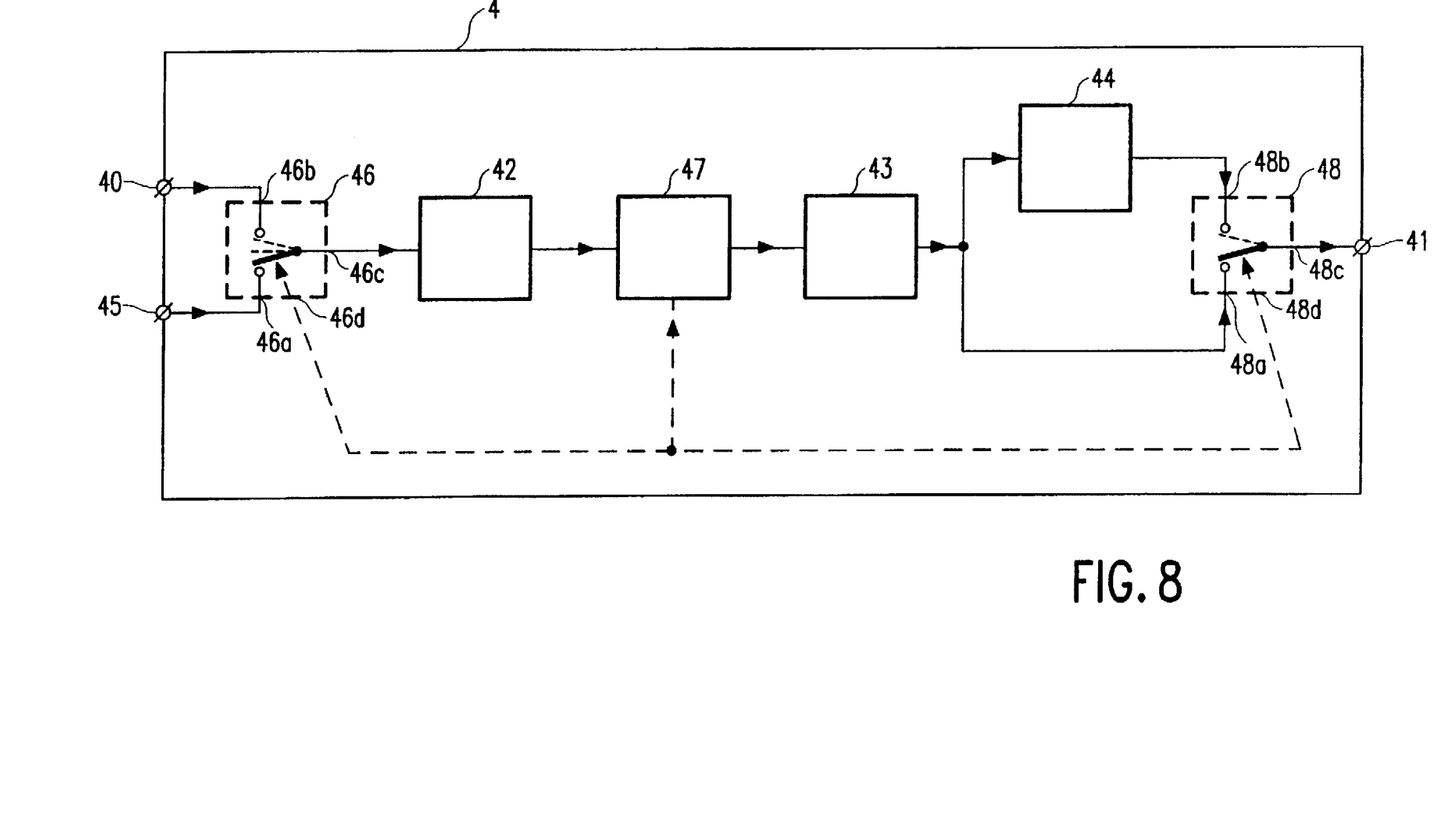

FIG. 8 shows an embodiment that is very similar to the one shown in FIG. 7, but modified in the following way: The output of means 47 is coupled to the input of interleaving means 43 described hereinbefore. The output of said interleaving means is coupled to input 48a of switching means 48 and to the input of post-interleaving means 44 described hereinbefore. The output of said post-interleaving means is coupled to input 48b of switching means 48.

Figure 9:
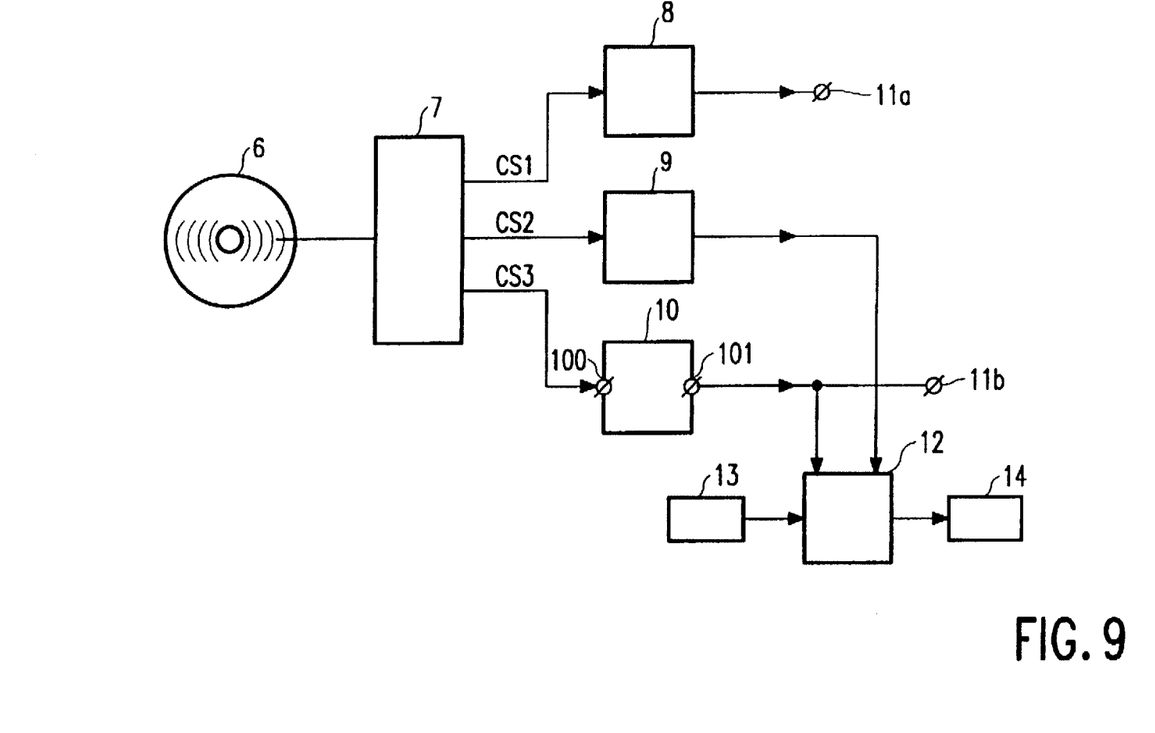
FIG. 9 shows, in a simplified form, the means for reproducing a signal recorded on a Compact Disc as described in [doc. 1].

FIG. 9 shows a reproduction apparatus according the prior art, for reproducing signals that have been recorded in a track on an optical information carrier in accordance with [doc. 1] and [doc. 2]. The reproduction apparatus comprises means 7 for reading a signal from the information carrier 6, said means futher comprising means for information-medium specific channel decoding and demultiplexing of the channel signals as described in [doc. 1]. A first output of reading means 7 provides a first channel signal CS1 and is coupled to the input of a main information decoder 8. Said main information decoder decodes the first channel signal CS1 as described in |doc. 1|, resulting in the main information signal that is being provided at the output of the main information decoder. This output is coupled to the output terminal 11a. A second output of reading means 7 provides a second channel signal CS2 and is coupled to the input of a cue information decoder 9. Said cue information decoder decodes the second channel signal CS2 as described in |doc. 1|, resulting in the cue information signal that is being provided at the output of the cue information decoder. This output is coupled to a system controller 12 of a known type. This system controller is usually coupled to means 13 for receiving input from a user, such as a keyboard, and to means 14 for presenting information to a user, such as a display device presenting text. A third output of reading means 7 provides a third channel signal CS3 and is coupled to the input of a sub information decoder 10. Said sub information decoder decodes the third channel signal CS3 as described in |doc. 2|, resulting in the sub information signal that is being provided at the output of the sub information decoder. This output is usually coupled to a system controller 12 as described hereinbefore, and it may be coupled to an output terminal 11b.

In the embodiments of the present invention, reading means 7 are adapted to read the first channel signal from the main information area of a track on the optical information carrier and to read the second and third channel signals from the lead-in area of said track preceding the main information area.

Figure 10:
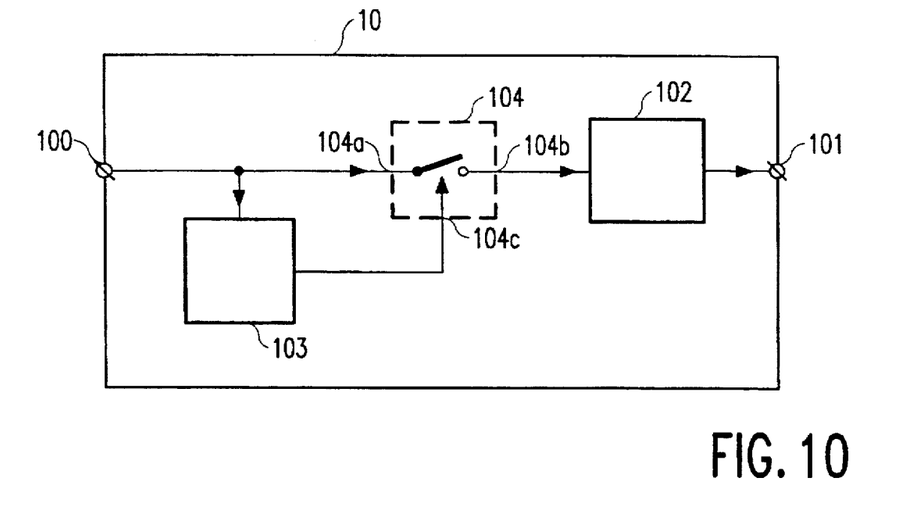
FIG. 10 shows an embodiments of the decoder for recovering the sub information signal according to the present invention, adapted to recovering sub information packs recorded in non-interleaved form.

FIG. 10 shows an embodiment of the sub information decoder 10 according to the present invention. This embodiment comprises an input 100 for receiving the third channel signal. This input is coupled to input 104a of switching means 104 and to the input of means 103 that recover the codeword and compare it to predetermined first codewords. Means 103 generate a control signal that is provided to control input 104c of switching means 104. Said switching means couple their input 104a to their output 104b or not, in dependence of the control signal supplied to control input 104c. The output of switching means 104 is coupled to the input of error correction means 102, said means being adapted to detect and, where possible, correct errors in the sub information pack. The output of the error correction means 102 is coupled to output 101 and provides the sub information signal. Error correction means 102 are known from [doc. 2]. These means comprise P-parity decoding and Q-parity decoding.

It is noted here that means 102 do not comprise means for delaying the individual symbols and for restoring the symbol sequence, as prescribed in [doc. 2].

Figure 11:
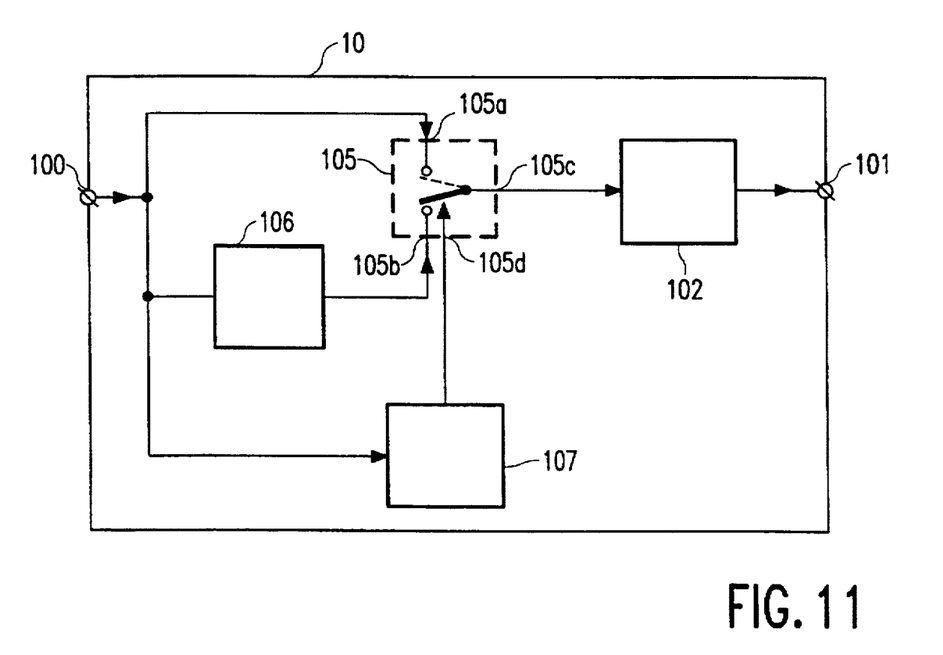
FIGS. 11 and 12 show embodiments of the decoder for recovering the sub information signal according to the present invention, adapted to recovering both sub information packs recorded in non-interleaved form and sub information packs recorded in interleaved form.

FIG. 11 shows another embodiment of the sub information decoder 10 according to the present invention. This embodiment comprises an input 100 for receiving the third channel signal. This input is coupled to input 105a of switching means 105 and to the input of de-interleaving means 106. Said de-interleaving means comprise means for delaying the individual symbols and for restoring the symbol sequence, as prescribed in [doc. 2]. The output of de-interleaving means 106 is coupled to input 105b of switching means 105. The switching means couple the signal from input 105a to the output 105c in response to a first control signal on control input 105d and couple the signal from input 105b to the output 105c in response to a second control signal on the control input 105d. The output 105c of the switching means 105 is coupled to the input of error correction means 102 described hereinbefore. The output of the error correction means 102 is coupled to output 101 and provides the sub information signal.

The first and second control signals may be provided by means 107, which comprise means for recovering the codeword in a sub information pack. The input of means 107 may be coupled to the input 100 or to another output from which sub information packs can be derived.

Figure 12:
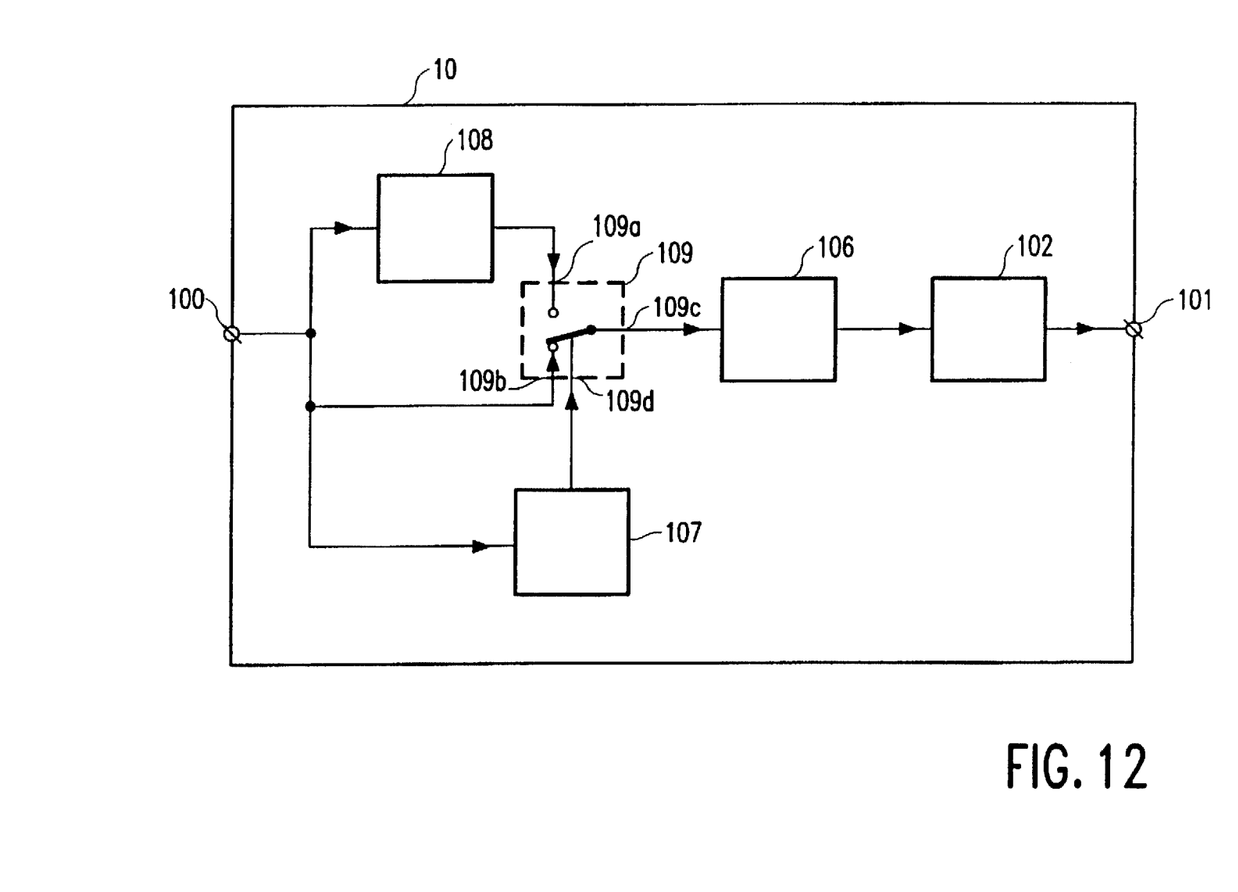

FIG. 12 shows another embodiment of the sub information decoder 10 according to the present invention. This embodiment comprises an input 100 for receiving the third channel signal. This input is coupled to input 109b of switching means 109 and to the input of interleaving means 108. Said interleaving comprises cross-connections to change the symbol sequence plus means for delaying the individual symbols, similar to the interleaving means described in |doc. 2| for use during recording. The output of interleaving means 108 is coupled to input 109a of switching means 109. The switching means couple the signal from input 109a to the output 109c in response to a first control signal on control input 109d and couple the signal from input 109b to the output 109c in response to a second control signal on the control input 109d. The output 109c of the switching means 105 is coupled to the input of de-interleaving means 106 described hereinbefore. The output of de-interleaving means 106 is coupled to the input of error correction means 102 described hereinbefore. The output of the error correction means 102 is coupled to output 101 and provides the sub information signal.

The first and second control signals may be provided by means 107, which comprise means for recovering the codeword in a sub information pack. The input of means 107 may be coupled to the input 100 or to another output from which sub information packs can be derived.

We claim:

1. A method of recording in a track on an optical information carrier a first channel signal representing a main information signal, a second channel signal representing a cue information signal and a third channel signal representing a sub information signal, said main information signal comprising at least one programme item and said cue information signal comprising for said at least one programme item an indication of its location in said track, the recording method comprising the steps of receiving the main information signal, the cue information signal and the sub information signal, encoding the main information signal, resulting in said first channel signal, encoding the cue information signal, resulting in said second channel signal, encoding the sub information signal by generating sub information packs comprising data from said sub information signal plus data for error detection and correction thereof, resulting in said third channel signal, writing the first channel signal in a main information area of said track on the information carrier, writing the second channel signal and the third channel signal in a lead-in area of said track preceding the main information area, characterized in that said sub information packs are generated in substantially non-interleaved form and included in that form in said third channel signal.

2. The method as claimed in claim 1, said step of encoding the sub information signal further comprising the step of interleaving said sub information packs, characterized in that said encoding step further comprises a step in which said sub information packs are post-interleaved after said interleaving step, so as to generate the said sub information packs in substantially non-interleaved form.

3. The method as claimed in claim 2, characterized in that said step of encoding the sub information signal comprises the steps of generating first codewords indicating sub information packs being substantially non-interleaved, and including a first codeword in sub information packs that are generated in substantially non-interleaved form.

4. The method as claimed in claim 2, for further recording on said optical information carrier a second sub information signal, characterized in that the recording method comprises the steps of encoding said second sub information signal by generating second sub information packs comprising data from said second sub information signal plus data for error detection and correction therof, and by interleaving said second sub information packs, inserting said interleaved second sub information packs in said third channel signal.

5. The method as claimed in claim 2, characterized in that said first mentioned sub information signal comprises packets carrying coded text.

6. The method as claimed in claim 1, characterized in that said first mentioned sub information signal comprises packets carrying coded text.

7. The method as claimed in claim 1, characterized in that said step of encoding the sub information signal comprises the steps of generating first codewords indicating sub information packs being substantially non-interleaved, and including a first codeword in sub information packs that are generated in substantially non-interleaved form.

8. The method as claimed in claim 7, characterized in that said first mentioned sub information signal comprises packets carrying coded text and in that said step of generating codewords is adapted to generating codewords that further mark those sub information packs in which at least part of a packet carrying coded text is comprised.

9. The method as claimed in claim 7, for further recording on said optical information carrier a second sub information signal, characterized in that the recording method comprises the steps of encoding said second sub information signal by generating second sub information packs comprising data from said second sub information signal plus data for error detection and correction therof, and by interleaving said second sub information packs, inserting said interleaved second sub information packs in said third channel signal.

10. The method as claimed in claim 7, characterized in that said first mentioned sub information signal comprises packets carrying coded text.

11. The method as claimed in claim 1, for further recording on said optical information carrier a second sub information signal, characterized in that the recording method comprises the steps of encoding said second sub information signal by generating second sub information packs comprising data from said second sub information signal plus data for error detection and correction thereof, and by interleaving said second sub information packs, inserting said interleaved second sub information packs in said third channel signal.

12. The method as claimed in claim 11, characterized in that said first mentioned sub information signal comprises packets carrying coded text.

13. The method as claimed in claim 11, characterized in that the recording method comprises the steps of generating first and second codewords, the first codewords indicating sub information packs being substantially non-interleaved, the second codewords indicating sub information packs being substantially interleaved, including a first codeword in sub information packs that are generated in substantially non-interleaved form and carried in that form in said third channel signal, and including a second codeword in sub information packs that are generated in substantially interleaved form and carried in that form in said third channel signal.

14. The method as claimed in claim 13, characterized in that said first mentioned sub information signal comprises packets carrying coded text.

15. The method as claimed in claim 1, the optical information carrier being a carrier such as a CD or CDV-disc, characterized in that said third channel signal is recorded in a sub information channel which is formed by at least one of the subcode channels R–W as defined in CEI/IEC Publication 908.

16. A recording apparatus for recording in a track on an optical information carrier a first channel signal representing a main information signal, a second channel signal representing a cue information signal and a third channel signal representing a sub information signal, said main information signal comprising at least one programme item and said cue information signal comprising for said at least one programme item an indication of its location on said track, the recording apparatus comprising means for receiving the main information signal, the cue information signal and the sub information signal, means for encoding the main information signal, providing said first channel signal, means for encoding the cue information signal, providing said second channel signal, means for encoding the sub information signal by generating sub information packs comprising data from said sub information signal plus data for error detection and correction thereof, providing said third channel signal, means for writing the first channel signal in a main information area of said track on the information carrier and for writing the second channel signal and the third channel signal in a lead-in area of said track preceding the main information area, characterized in that said means for encoding the sub information signal are adapted to generate said sub information packs in substantially non-interleaved form and to provide said third channel signal carrying sub information packs in that form.

17. The recording apparatus as claimed in claim 16, said means for encoding the sub information signal further being provided with means for interleaving said sub information packs, characterized in that said encoding means further comprise means for post-interleaving said interleaved sub information packs, so as to generate the said sub information packs in substantially non-interleaved form.

18. The recording apparatus as claimed in claim 16, characterized in that the means for encoding the sub information signal comprises means for generating first codewords indicating sub information packs being substantially non-interleaved, means for including a first codeword in sub information packs that are generated in substantially non-interleaved form.

19. The recording apparatus as claimed claim 18, characterized in that said means for receiving the sub information signal are adapted to receiving packets carrying coded text, said means for encoding a sub information signal are adapted to include data from said packets carrying coded text in the sub information packs, said means for generating codewords are adapted to generate codewords that further mark those sub information packs in which at least part of a packet carrying coded text is comprised.

20. The recording apparatus as claimed in claim 16, further adapted to record on said optical information carrier a second sub information signal, characterized in that the recording apparatus comprises means for encoding said second sub information signal by generating second sub information packs comprising data from said second sub information signal plus data for error detection and correction thereof and by interleaving said second sub information packs, means for inserting said interleaved second sub information packs in said third channel signal.

21. The recording apparatus as claimed in claim 20, characterized in that the recording apparatus comprises means for generating first and second codewords, the first codewords indicating sub information packs being substantially non-interleaved, the second codewords indicating sub information packs being substantially interleaved, means for including a first codeword in sub information packs that are generated in substantially non-interleaved form, and for including a second codeword in sub information packs that are generated in substantially interleaved form, means for inserting said non-interleaved packs and said interleaved packs in said third channel signal.

22. The recording apparatus as claimed in claim 16, characterized in that said means for receiving the sub information signal are adapted to receiving a coded-text signal and in that said means for encoding a sub information signal are adapted to include data from the coded-text signal in the sub information packs.

23. The recording apparatus as claimed in claim 16, the optical information carrier being a carrier such as a CD or CDV-disc, characterized in that said third channel signal is recorded in a sub information channel which is formed by at least one of the subcode channels R–W as defined in CEI/IEC Publication 908.

24. A reproduction apparatus for reproducing information from a track on an optical information carrier, the apparatus being provided with reading means for reading a first channel signal representing a main information signal recorded in a main information area of said track, a second channel signal representing a cue information signal and a third channel signal representing a sub information signal, said second and third channel signals having been recorded in a lead-in area of said track preceding said main information area, means for decoding the first channel signal to recover said main information signal, means for decoding the second channel signal to recover said cue information signal, means for decoding the third channel signal to recover said sub information signal, said means comprising means for error detection and correction, so as to correct errors that may be present in said third channel signal, characterized in that said means for decoding the third channel signal are devoid of means for de-interleaving.

25. The reproduction apparatus as claimed in claim 24, said third channel signal carrying sub information packs comprising a codeword, data from said sub information signal, and data for error detection and correction thereof, characterized in that said means for decoding said third channel signal comprises means for recovering said codeword from a sub information pack, means for comparing said codeword to first codewords indicating sub information packs being substantially non-interleaved, switching means being adapted to enable the supply of said sub information signal to the output in response to recognising said codeword as being a first codeword and being adapted to disable the supply of said sub information signal to the output in response to recognising said codeword as not being a first codeword.

26. The reproduction apparatus as claimed in claim 25, characterised in that said means for decoding the third channel signal being adapted to comparing said codeword to codewords identifying sub information packs that comprise at least part of a packet carrying coded text, reconstructing packets carrying coded text from data comprised in those sub information packs that are recognised as comprising at least part of a packet carrying coded text, providing said packets carrying coded text to means adapted to decoding and displaying text.

27. The reproduction apparatus as claimed in claim 24, characterised in that said means for decoding the third channel signal being adapted to reconstruct, from the data comprised in said sub information packs, packets carrying coded text.

28. The reproduction apparatus as claimed in claim 24, the optical information carrier being a carrier such as a CD or CDV-disc, characterized in that said third channel signal is recorded in a sub information channel which is formed by at least one of the subcode channels R–W as defined in [doc. 1].

29. The reproduction apparatus for reproducing information from a track on an optical information carrier, the apparatus being provided with reading means for reading a first channel signal representing a main information signal recorded in a main information area of said track, a second channel signal representing a cue information signal and a third channel signal representing a sub information signal, said second and third channel signals having been recorded in a lead-in area of said track preceding said main information area, means for decoding the first channel signal to recover said main information signal, means for decoding the second channel signal to recover said cue information signal, means for decoding the third channel signal to recover said sub information signal, said means comprising means for de-interleaving said third channel signal, so as to obtain a de-interleaved third channel signal, said decoding means further comprising error correction means for error detection and correction, so as to correct errors that may be present in said third channel signal, characterized in that said means for decoding comprise switching means being adapted to provide said third channel signal to said error correction means in response to the presence of a first control signal and to provide said de-interleaved third channel signal to said error correction means in response to the presence of a second control signal.

30. The reproduction apparatus as claimed in claim 29, characterized in that it further comprises means for generating said first control signal in correlation with reading the lead-in area of said track and said second control signal in correlation with reading the main information area of said track.

31. The reproduction apparatus as claimed in claim 29, said third channel signal carrying sub information packs comprising a codeword, data from said sub information signal, and data for error detection and correction thereof, characterized in that said means for decoding said third channel signal comprises means for recovering said codeword in a sub information pack, means for generating said first control signal in response to said codeword being a first codeword and for generating said second control signal in response to said codeword being a second codeword.

32. An optical information carrier comprising a first channel signal recorded in a main information area of a track on the information carrier and having second and third channel signals recorded in a lead-in area of said track preceding said main information area, said first channel signal representing a main information signal comprising at least one programme item, said second channel signal representing a cue information signal comprising for said at least one programme item an indication of its location on said track, said third channel signal representing a sub information signal carrying sub information packs comprising data from said sub information signal plus data for error detection and correction thereof, characterized in that said sub information packs are carried in substantially non-interleaved form in said recorded third channel signal.

33. The optical information carrier as claimed in claim 32, characterized in that said first mentioned sub information signal comprises packets carrying coded text.

34. The optical information carrier as claimed in claim 32, the optical information carrier being a carrier such as a CD or CDV-disc, characterized in that said third channel signal has been recorded in a sub information channel which is formed by at least one of the subcode channels R–W as defined in CEI/IEC Publication 908 .

35. The optical information carrier as claimed in claim 32, characterized in that second sub information packs, comprising data from a second sub information signal plus data for error detection and correction thereof, are included in substantially interleaved form in said recorded third channel signal.

36. The optical information carrier as claimed in claim 35, characterized in that said first mentioned sub information signal comprises packets carrying coded text.

37. The optical information carrier as claimed in claim 35, characterized in that a first codeword is included in sub information packs that are carried in substantially non-interleaved form in said recorded third channel signal and in that a second codeword is included in sub information packs that are carried in substantially interleaved form in said recorded third channel signal.

38. The optical information carrier as claimed in claim 37, characterized in that said first mentioned sub information signal comprises packets carrying coded text.

39. The optical information carrier as claimed in claim 32, characterized in that a first codeword is included in said sub information packs indicating that said sub information packs are carried in substantially non-interleaved form in said recorded third channel signal.

40. The optical information carrier as claimed in claim 39, characterized in that said first mentioned sub information signal comprises packets carrying coded text and in that said codewords further mark those sub information packs in which at least part of a packet carrying coded text is comprised.

41. The optical information carrier as claimed in claim 39, characterized in that second sub information packs, comprising data from a second sub information signal plus data for error detection and correction thereof, are included in substantially interleaved form in said recorded third channel signal.

42. The optical information carrier as claimed in claim 39, characterized in that said first mentioned sub information signal comprises packets carrying coded text.

* * * * *